United States Patent [19]
Shiga

[11] Patent Number: 5,089,788
[45] Date of Patent: Feb. 18, 1992

[54] CIRCUIT FOR DRIVING A PHOTO-RECEIVER

[75] Inventor: Nobuo Shiga, Yokohama, Japan

[73] Assignee: Sumitomo Electric Industries, Ltd., Osaka, Japan

[21] Appl. No.: 593,978

[22] Filed: Oct. 9, 1990

[30] Foreign Application Priority Data

Oct. 13, 1989 [JP] Japan .................. 1-267552

[51] Int. Cl.$^5$ .............................................. H03F 3/08
[52] U.S. Cl. ........................................ 330/59; 330/308; 250/214 A; 359/189
[58] Field of Search .............. 330/59, 207 P, 281, 330/296, 297, 298, 308; 250/214 A; 455/619

[56] References Cited

U.S. PATENT DOCUMENTS

4,188,551  2/1980  Iwasaki et al. ............. 250/214 A X
4,620,321  10/1986  Chown ....................... 250/214 A X

FOREIGN PATENT DOCUMENTS

0005241  1/1977  Japan ......................................... 330/59
2016686  9/1979  United Kingdom ................... 330/59

*Primary Examiner*—Steven Mottola
*Attorney, Agent, or Firm*—Stevens, Davis, Miller & Mosher

[57] ABSTRACT

Where a high bias voltage is required for a photo-element of a photo-receiver, a high voltage is applied to an amplifier which amplifies a photo-current created by the photo-element, when a power supply is turned on. In a prior art photo-receiver, the amplifier may be broken due to this high voltage. In the present invention, the photo-receiver is provided with a protection circuit comprising a diode connected between a power supply circuit and a photo-element, a resistor connected in parallel with the diode, and a first capacitor having one end thereof connected to an anode of the diode and the other end thereof connected to a reference potential. Constants of the circuit components are set such that a time constant of the supply of the power to the amplifier is smaller than a rising time constant of the supply of the power to the photo-element and larger than a falling time constant of the supply of the power to the photo-element. Accordingly, the supply of the power to the photo-element is started after the potential at the input terminal of the amplifier has been established and the potential at the input terminal of the amplifier floats after the supply of the power to the photo-element has been fully extinguished. As a result, the amplifier does not suffer breakdown at the time of power-on and a surge voltage is not applied to the input terminal of the amplifier at the time of power-off.

6 Claims, 5 Drawing Sheets

CIRCUIT FOR DRIVING A PHOTO-RECEIVER

BACKGROUND OF THE INVENTION

1. Field of the Invention

The present invention relates to a photo-receiver which is a combination of a photo-diode and a preamplifier, and more particularly to a photo-receiver which has a circuit for protecting an amplifier.

2. Related Background Art

A prior art photo-receiver of this type is configured as shown in FIG. 1. A cathode of an avalanche photo-diode (APD) 1 is connected to a biasing power supply (not shown) and an anode thereof is connected to an input terminal of an amplifier 2. Power is supplied to the amplifier 2 from a positive power supply and a negative power supply (not shown). When a light is applied to the APD1, a photo-output current is produced and it is amplified by the amplifier 2.

A voltage supplied to the APD1 by the biasing power supply is approximately 30 volts when the APD1 is made of germanium (Ge). It is approximately 80 volts when the APD1 is made of indium gallium arsenide (InGaAs). Because the voltage to be supplied to the APD1 is high, the following problem is encountered.

If the supply of the power to the APD1 by the biasing power supply is started after the start of the supply of the voltage to the amplifier 2 by the positive power supply and the negative power supply and before the fixation of the potential at the input terminal of the amplifier 2, the potential at the input terminal of the amplifier 2 rises at the moment of the start of the supply of the power to the APD1 and the amplifier 2 may suffer failure. This is explained below. At the time of the start of the supply of the power to the APD1, no charge is stored in a junction capacitance $C_{APD}$ across the terminals of the APD1. As a result, a potential difference between the terminals is zero and the high voltage supplied from the biasing power supply is applied to the input terminal of the amplifier 2 as it is. As a result, the amplifier 2 would suffer breakdown.

SUMMARY OF THE INVENTION

It is an object of the present invention to solve the above problem. To this end, in accordance with the present invention, the photo-receiver is provided with a protection circuit which comprises a diode having a cathode thereof connected to a power supply circuit and an anode thereof connected to a cathode of a photo-diode, a resistor connected in parallel with the diode, and a first capacitor having one end thereof connected to the anode of the diode and the other end thereof connected to a reference potential. Constants of circuit elements are selected such that each of a rising time constant and a falling time constant of the supply of power to an amplifier which amplifies an output of the photo-diode is smaller than a rising time constant of the supply of power to the photo-diode and larger than a falling time constant of the supply of power to the photo-diode.

Accordingly, the voltage applied from the power supply circuit to the input terminal of the amplifier rises later than the establishment of the power supply voltage of the amplifier when the power supply is turned on, and falls earlier than the extinguishment of the power supply voltage of the amplifier when the power supply is turned off. As a result, it does not happen that the power supply voltage supplied to the photo-diode is applied to the input terminal of the amplifier when the power supply is turned on to cause the amplifier to breakdown, as is done in the prior art. Further, when the power supply is turned off, no surge voltage is applied to the input terminal of the amplifier and the amplifier is protected.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
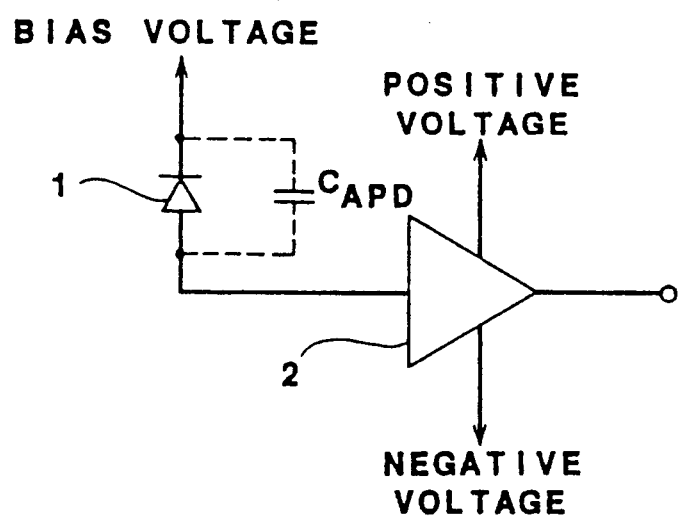
FIG. 1 shows a prior art photo-receiver.
Figure 2:
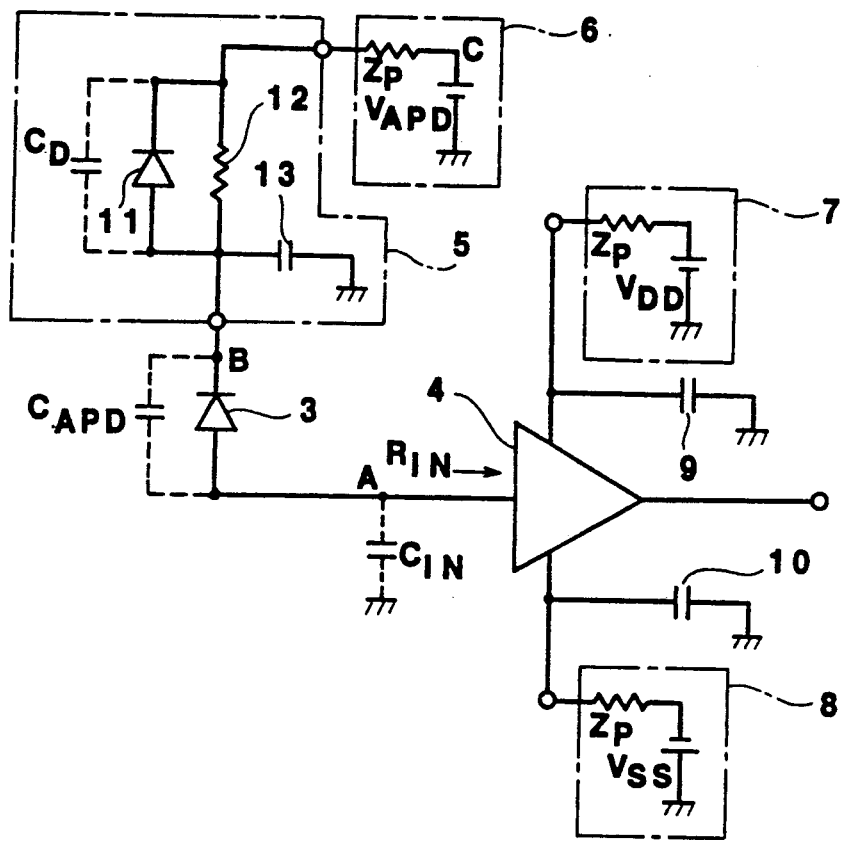
FIG. 2 shows a photo-receiver in accordance with one embodiment of the present invention.

FIG. 2 shows a configuration of a photo-receiver in accordance with one embodiment of the present invention.

The photo-receiver comprises an APD3 which receives a photo-signal, an amplifier 4 which amplifies the signal received by the APD3, and a protection circuit 5 which protects the amplifier 4. A power supply is supplied to the APD3 from a power supply circuit 6, and a positive power from a power supply circuit 7 and a negative power from a power supply circuit 8 are supplied to the amplifier 4. Further, a bypass capacitor 9 is connected in parallel with the power supply circuit 7, and a bypass capacitor 10 is connected in parallel with the power supply circuit 8. Both capacitances are equally set to C1.

The protection circuit 5 comprises a diode 11 having a cathode thereof connected to the power supply circuit 6 and an anode thereof connected to the APD3, a resistor 12 having a resistance R1 connected in parallel with the diode 11, and a capacitor 13 having a capacitance C2 and having one end thereof connected to the anode of the diode 11 and the other end thereof grounded. There exist a junction capacitance $C_D$ across the terminals of the diode 11 and a junction capacitance $C_{APD}$ across the terminals of the APD3. There exists an input capacitance $C_{IN}$ at the input of the amplifier 4. The amplifier 4 has an input resistance $R_{IN}$.

The power supply circuits 6, 7 and 8 supply voltages and currents from power supplies $V_{APD}$, $V_{DD}$ and $V_{SS}$. The power supply circuit 6 supplies a voltage of approximately 30 volts which is required by the APD3 which is made of germanium (Ge), and the power supply circuits 7 and 8 supply voltages of $+5$ volts and $-5$ volts, respectively. The APD3 may be made of InGaAs, in which case the output voltage of the power supply circuit 6 should be approximately 80 volts. While the power supplies $V_{APD}$ and $V_{DD}$ of the power supply circuits 6 and 7 are separately shown, they are actually constructed by a single device and the power supply $V_{DD}$ is a voltage-division of the power supply $V_{APD}$. Internal resistances of the power supply circuits 6, 7 and 8 are equally set to $Z_P$.

In the actual circuit, the resistance R1 of the resistor 12 is sufficiently larger than the internal resistance $Z_P$ of the power supply circuit 6, and the capacitance C2 of the capacitor 13 is sufficiently larger than the junction capacitance $C_D$, the junction capacitance $C_{APD}$ and the input capacitance $C_{IN}$. The input resistance $R_{IN}$ of the amplifier 4 can be approximated to infinity. Accordingly, a rising time constant $T_1$ of the supply of the power to the APD3 by the power supply circuit 6 is essentially determined by the capacitor 13 and the resistor 12 and it is given by $2\pi \times C2 \times R1$. A falling time constant $T_2$ of the supply of power to the APD3 by the power supply circuit 6 is determined by a sum of the internal resistance $Z_P$ of the power supply circuit 6 and a forward resistance $R_F$ of the diode 11, and the capacitor 13, and it is given by $2\pi \times C2 \times (Z_P \times R_F)$. Rising and falling time constants $T_O$ of the supply of power to the amplifier 4 by the power supply circuits 7 and 8 are determined by the capacitors 9 and 10 and the internal resistances $Z_P$ of the power supply circuits 7 and 8, and it is given by $2\pi \times C1 \times Z_P$. The constants of the circuit components are selected such that the time constants meet the following condition:

$$C2 \times (Z_P + R_F) < C1 \times Z_P < C2 \times R1 \qquad (1)$$

Each of the rising and falling time constants $T_O$ of the supply of power to the amplifier 4 is smaller than the rising time constant $T_1$ of the supply of power to the APD3 and larger than the falling time constant $T_2$ of the supply of power of the APD3.

As described above, since the power supply circuits 6 and 7 are constructed by a single device, the respective power supply voltages are established simultaneously. A potential at a point A connected to the input terminal of the amplifier 4 is floating before the power supply voltage supplied to the amplifier 4 from the power supply circuits 7 and 8 is established. In the prior art photo-receiver which has no protection circuit, a high voltage supplied from the power supply circuit 6 is applied to the point A when the input of the amplifier 4 is floating. Accordingly, in the prior art photo-receiver, there is a high risk that the amplifier 4 will fail. However, in the present embodiment which includes the protection circuit 5, the amplifier 4 is protected from breakdown as described below.

Figure 3:
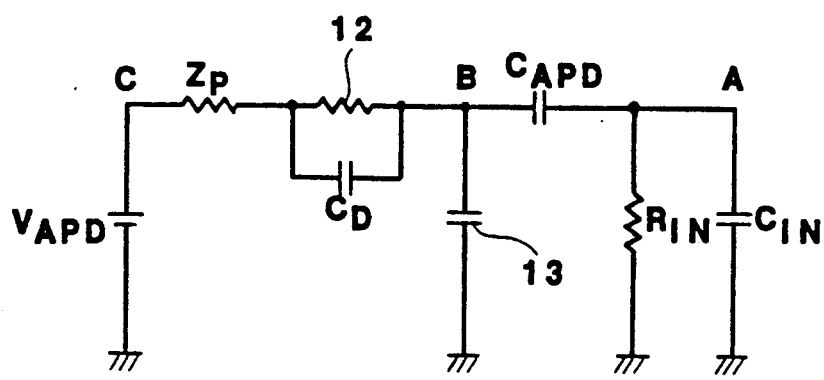
FIG. 3 shows an equivalent circuit of the photo-receiver of FIG. 2.

FIG. 3 shows an equivalent circuit of the photo-receiver of FIG. 2, in the input of the amplifier 4 when the power supply is turned on. Like elements to those shown in FIG. 2 are designated by like reference numerals.

The current supplied from the supply $V_{APD}$ of the power supply circuit 6 is supplied to a parallel circuit of the resistor 12 of the protection circuit 5 and the junction capacitance $C_D$ through the internal resistance $Z_P$. The diode 11 and the APD3 shown in FIG. 2 are neglected because the direction of current supply is reversed. Connected to the parallel circuit are the capacitor 13 having one end thereof grounded and the junction capacitance $C_{APD}$. Further, connected to the junction capacitance $C_{APD}$ are the input resistance $R_{IN}$ of the amplifier 4 and the input capacitance $C_{IN}$ of the amplifier 4. The junction of the resistance $R_{IN}$ and the capacitance $C_{IN}$ corresponds to the point A in FIG. 2 which is connected to the input terminal of the amplifier 4, and the junction of the junction capacitance $C_{APD}$ and the resistor 12 corresponds to a point B in FIG. 2 which is connected to the cathode of the APD3. The junction of the internal resistance $Z_P$ and the power supply $V_{APD}$ corresponds to a point C in FIG. 2.

Figure 4:
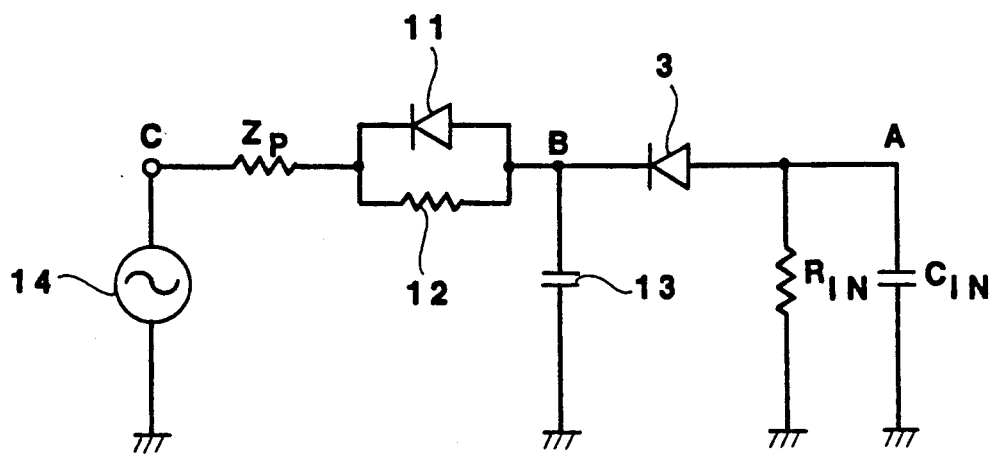
FIG. 4 shows a simulation circuit for the equivalent circuit of FIG. 3.
Figure 5:
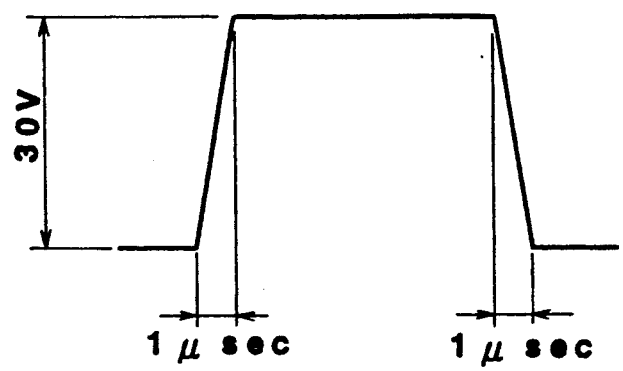
FIG. 5 shows a waveform of a power supply voltage applied to the circuit of FIG. 4.

In a simulation circuit shown in FIG. 4 which corresponds to the equivalent circuit of FIG. 3, a change of voltages at various points of the circuit is simulated. In place of the junction diodes $C_D$ and $C_{APD}$ of FIG. 3, the diode 11 and the APD3 are connected as shown. It is assumed that the internal resistance $Z_P$ of the power supply circuit 6 is 1 $\Omega$, the resistance R1 of the resistor 12 is 5 K$\Omega$, the capcitance C2 of the capacitor 13 is 330 pF, the input resistance $R_{IN}$ of the amplifier 4 is 10 M$\Omega$, and the input capacitance $C_{IN}$ is 0.5 pF. A simulation power supply 14 which corresponds to the supply $V_{APD}$ supplies a voltage having a waveform shown in FIG. 5. The output voltage waveform has a rising time and a falling time which are equal to 1 $\mu$sec, and an amplitude of 30 volts.

Figure 6:
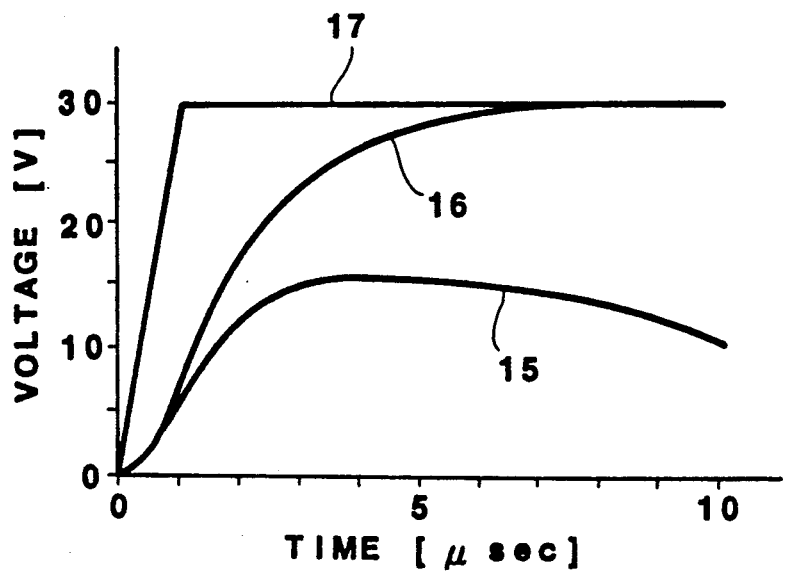
FIG. 6 shows a graph of simulation of a change of voltages at various points of the circuit when the power supply is turned on, FIG. 7 shows a graph of simulation of a change of voltages at various points of the circuit when the power supply is turned off.

FIG. 6 shows a graph of a simulation of a change of voltages at various points at the rise time of the power supply voltage supplied to the amplifier 4 from the power supply circuit 6. An abscissa of the graph represents a time (in $\mu$sec) and an ordinate represents a voltage (in volt). A curve 15 shows a change of the voltage at the point A, a curve 16 shows a change of the voltage at the point B, and a curve 17 shows a change of the voltage at the point C. As described above, the rise time of the change of the voltage at the point B is essentially determined by the time constant $2\pi \times C2 \times R1$. As seen from the graph, the voltage at the point B rises with the time constant of 10 $\mu$sec. It seen that the change of the voltage at the point A is slightly delayed from the change of the voltage at the point B. The voltage at the input terminal of the amplifier 4 shifts from the floating state to a fixed potential as the power supply voltage of the amplifier 4 is established. As described above, the time constant $2\pi \times C1 \times Z_P$ of the input terminal is set smaller than the rising time constant $2\pi \times C2 \times R1$ of the voltage at the point B. Accordingly, the voltage is applied to the point A by the power supply circuit 6 after the power supply voltage of the amplifier 4 has been established, that is, after the voltage at the input terminal of the amplifier 4 by the power supply circuits 7 and 8 has been established. Accordingly, the amplifier 4 is prevented from breakdown when the power supply is turned on.

Figure 7:
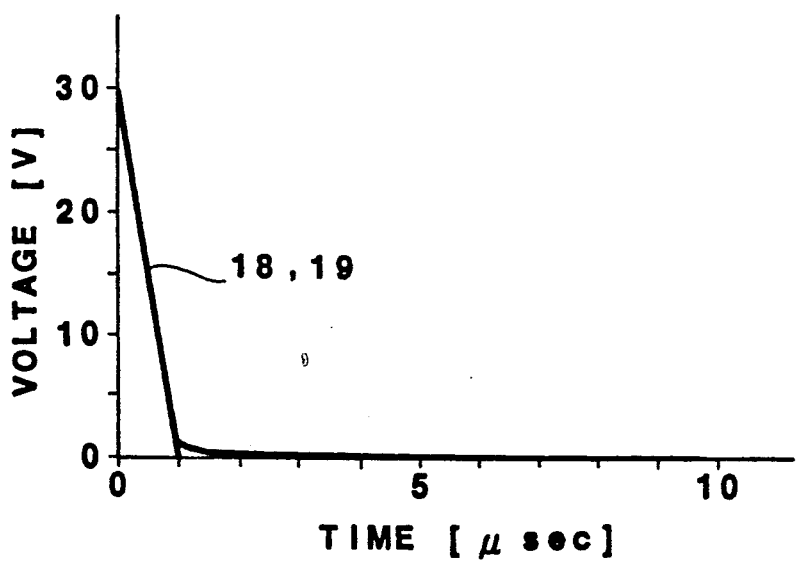

A simulation when the power supply is tuned off is shown in the graph of FIG. 7. An abscissa of the graph represents a time (in $\mu$sec) and an ordinate represents a voltage (in volts). Curves 18 and 19 show changes of the voltages at the points B and C, respectively. The curve 18 reaches 0 volts in 1 μsec while the curve 19 reaches 0 volt later. It is assumed that the voltage at the point A is kept at 0 volt. As seen from the graph, when the power supply is turned off, the changes of the voltages at the points B and C are essentially the same, because the diode 11 functions forward when the power supply is turned off. Accordingly, the voltage at the point B falls simultaneously with the extinguishment of the power supply voltage of the simulation power supply 14 (power supply circuit 6), and the falling time constant $2\pi \times C2 \times (Z_P + R_F)$ is smaller than the falling time constant $2\pi \times C1 \times Z_P$ of the power supply voltage of the amplifier 4, as described before. As a result, the voltage at the point A, that is, the voltage at the input terminal of the amplifier 4, is fixed to 0 volt until the voltage at the point B fully falls. Namely, the input terminal of the amplifier 4 floats after the high voltage supplied by the power supply circuit 6 has fully extinguished. Accordingly, the amplifier 4 does not breakdown.

Figure 8:
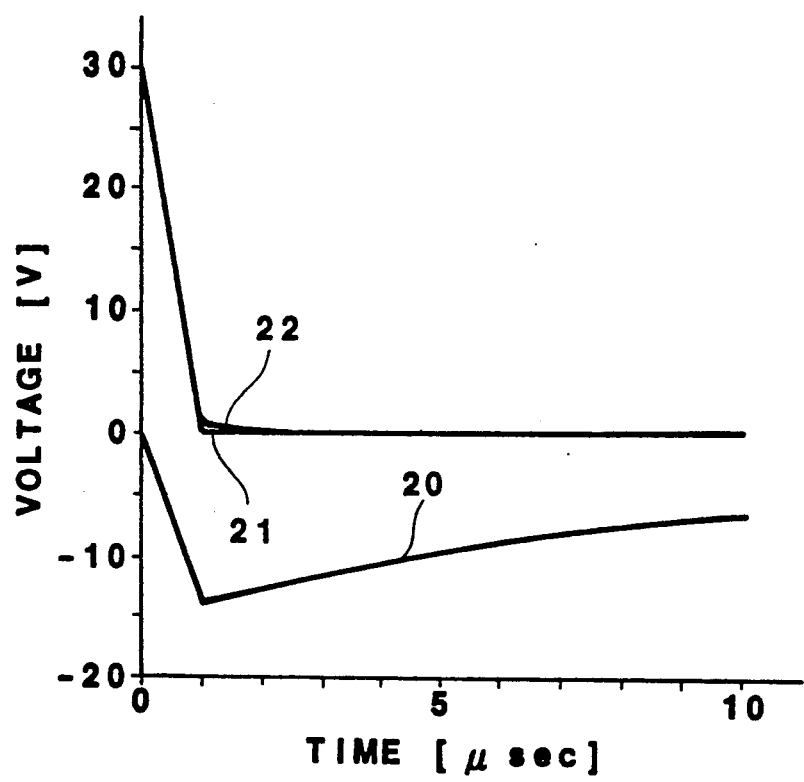
FIG. 8 shows a graph of simulation of a change of voltages at various points of the circuit when the power supply is turned off in a prior art circuit where the embodiment of the present invention is not applied.

In the prior art circuit which has no protection circuit 5, the point A floats before the voltage at the point B fully falls. In this case a change of the voltage at various points of the circuit is shown in FIG. 8 in which an abscissa represents a time (in μsec) and an ordinate represents a voltage (in volt). Curves 20, 21 and 22 show changes of the voltages at the points A, B and C. In the prior art circuit, since the voltage at the input terminal of the amplifier 4 is in a floating state when the power supply is turned off, the voltage at the point A is affected by the voltage at the point B and falls negatively to a great extent as shown. This voltage drop appears as a surge voltage which causes the amplifier 4 to breakdown. However, according to the embodiment of the present invention, such a voltage is not created and the amplifier 4 is protected.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

I claim:

1. A circuit for driving a photo-diode, comprising:
    a diode having a cathode thereof connected to a power supply circuit and an anode adapted to be connected to the photo-diode;
    a resistor connected in parallel with said diode;
    a first capacitor having one end thereof connected to an anode of said diode and the other end thereof connected to a reference potential;
    an amplifier having an input thereof adapted to be connected to an anode of the photo-diode and a power supply terminal thereof supplied power from said power supply circuit; and
    a second capacitor having one end thereof connected to said power supply terminal and the other end thereof connected to a reference potential,
    characteristics of circuit components being selected such that a time constant determined by said second capacitor and an internal resistance of said power supply circuit is smaller than a rising time constant determined by said first capacitor and said resistor and larger than a falling time constant determined by a sum of the internal resistance of said power supply circuit and a forward resistance of said diode, and said first capacitor.

2. A circuit according to claim 1 wherein said photo-diode is an avalanche diode made of germanium (Ge) system.

3. A circuit according to claim 1 wherein a power supply portion of said power supply circuit which supplies power to said amplifier comprises a positive power supply circuit for supplying a positive voltage and a negative power supply circuit for supplying a negative voltage, said amplifier has a positive power supply terminal and a negative power supply terminal, said positive voltage and said negative voltage are supplied to said positive power supply terminal and said negative power supply terminal, respectively, first ends of two second capacitors are connected to said positive power supply terminal and said negative power supply terminal, respectively, and second ends of the second capacitors are connected to the reference potential.

4. A circuit according to claim 1, wherein said photo-diode is an avalanche diode made of indium gallium arsenide.

5. A circuit for driving a photo-diode comprising:
    a first supply circuit adapted to be connected to the photo-diode and to a power source, for supplying a first driving voltage to the photo-diode;
    amplifying means adapted to be connected to the photo-diode, for amplifying an output of the photo-diode; and
    a second supply circuit connected to said amplifying means and adapted to be connected to a power source, for supplying a second driving voltage which is lower than said first driving voltage;
    characteristics of circuit components constructing said first and second supply circuits being selected such that supply of the first driving voltage to said photo-diode starts after supply of said second driving voltage to said amplifying means and finishes prior to completion of supply of said second driving voltage to said amplifying means.

6. A photo-receiver comprising:
    a diode having a cathode thereof adapted to be connected to a power supply;
    a resistor connected in parallel with said diode;
    a first capacitor having one end thereof connected to an anode of said diode and the other end thereof adapted to be connected to a reference potential;
    a photo-diode having a cathode thereof connected to the anode of said diode;
    an amplifier having an input thereof connected to an anode of said photo-diode and adapted to be connected to the power supply; and
    a second capacitor having one end thereof adapted to be connected to the power supply and the other end thereof adapted to be connected to a reference potential,
    characteristics of circuit components constructing said first and second supply circuits being selected such that supply of the first driving voltage to said photo-diode starts after supply of said second driving voltage to said amplifying means and finishes prior to completion of supply of said second driving voltage to said amplifying means.

* * * * *